United States Patent
Danielsson et al.

(10) Patent No.: US 8,961,785 B2
(45) Date of Patent: *Feb. 24, 2015

(54) ROTARY DISC FILTER AND MODULE FOR CONSTRUCTING SAME

(71) Applicants: Åke Danielsson, Skanor (SE); Åke Ralvert, Hässleholm (SE); Emil Svensson, Trelleborg (SE); Per Larsson, Trelleborg (SE)

(72) Inventors: Åke Danielsson, Skanor (SE); Åke Ralvert, Hässleholm (SE); Emil Svensson, Trelleborg (SE); Per Larsson, Trelleborg (SE)

(73) Assignee: Veolia Water Solutions & Technologies Support, Saint Maurice (FR)

(*) Notice: Subject to any disclaimer, the term of this patent is extended or adjusted under 35 U.S.C. 154(b) by 0 days.

This patent is subject to a terminal disclaimer.

(21) Appl. No.: 13/765,942

(22) Filed: Feb. 13, 2013

(65) Prior Publication Data

US 2013/0153486 A1 Jun. 20, 2013

Related U.S. Application Data

(63) Continuation of application No. 13/174,879, filed on Jul. 1, 2011, now Pat. No. 8,409,436, which is a continuation of application No. 12/569,979, filed on Sep. 30, 2009, now Pat. No. 7,972,508, which is a continuation of application No. 10/546,477, filed as application No. PCT/SE2004/000240 on Feb. 24, 2004, now Pat. No. 7,597,805.

(51) Int. Cl.
*B01D 33/23* (2006.01)
*B01D 29/58* (2006.01)
*B01D 33/21* (2006.01)

(52) U.S. Cl.
CPC ............... *B01D 29/58* (2013.01); *B01D 33/21* (2013.01)
USPC ........................... 210/232; 210/331; 210/486

(58) Field of Classification Search
USPC ........................................ 210/232, 331, 486
See application file for complete search history.

(56) References Cited

U.S. PATENT DOCUMENTS

| | | | |
|---|---|---|---|
| 3,163,601 A | 12/1964 | Ericson et al. | |
| 3,331,512 A | 7/1967 | Vore | |
| 3,363,770 A | 1/1968 | Glos, II | |

(Continued)

FOREIGN PATENT DOCUMENTS

| | | |
|---|---|---|
| JP | 63-219691 | 9/1988 |
| JP | 8-506761 | 7/1996 |

(Continued)

OTHER PUBLICATIONS

Siemens Industry, Inc.'s Second Amended Answer to Plaintiffs Amended Complaint and Counterclaims filed Feb. 12, 2013 in *Veolia Water Solutions & Technologies Support v. Siemens Industry, Inc.*, United States District Court, Eastern District of North Carolina, Western Division, Case No. 5:11-cv-00296-FL (102 pages).

(Continued)

*Primary Examiner* — Thomas M Lithgow
(74) *Attorney, Agent, or Firm* — Coats and Bennett, PLLC

(57) ABSTRACT

A rotary disc filter device includes a rotary drum and one or more disc-shaped filter members secured about the drum. Each disc-shaped filter member includes a filter and a filter support comprising a series of modules. The modules each include a base that is secured to the rotary drum and a support arm projecting outwardly from the base. The modules are interconnected and disposed around the rotary drum.

51 Claims, 4 Drawing Sheets

(56) References Cited

U.S. PATENT DOCUMENTS

| | | | |
|---|---|---|---|
| 3,610,419 | A | 10/1971 | Vallee |
| 4,865,732 | A | 9/1989 | Garrant et al. |
| 4,950,403 | A | 8/1990 | Hauff et al. |
| 5,084,174 | A | 1/1992 | Perala et al. |
| 5,242,590 | A | 9/1993 | Thomson et al. |
| 5,304,304 | A | 4/1994 | Jakobson et al. |
| 5,635,062 | A | 6/1997 | Cameron et al. |
| 5,804,071 | A | 9/1998 | Haeffner |
| 6,231,761 | B1 | 5/2001 | Mohlin et al. |
| 7,255,723 | B2 | 8/2007 | Choi et al. |
| 7,293,659 | B2 | 11/2007 | Grace |
| 7,597,805 | B2 * | 10/2009 | Danielsson et al. .......... 210/232 |
| 7,972,508 | B2 | 7/2011 | Danielsson et al. |
| 8,409,436 | B2 * | 4/2013 | Danielsson et al. .......... 210/232 |
| 2011/0024347 | A1 | 2/2011 | Larsson |

FOREIGN PATENT DOCUMENTS

| | | |
|---|---|---|
| JP | 2002-508235 | 3/2002 |
| JP | 2003284906 | 10/2003 |
| JP | 2004041970 | 2/2004 |
| SE | 318859 | 4/1965 |
| SE | 224131 | 1/1969 |
| SE | 9300541-1 | 1/1995 |
| SE | 9704632-0 | 8/1999 |
| SE | 9603333-7 | 6/2003 |
| WO | 91/12067 | 8/1991 |
| WO | 98/01206 | 1/1998 |
| WO | 99/30797 | 6/1999 |
| WO | 00/37159 | 6/2000 |
| WO | 00/76620 A1 | 12/2000 |

OTHER PUBLICATIONS

Siemens Industry Inc.'s Disclosure of Preliminary Noninfringement and Invalidity Contentions filed Apr. 20, 2012 in *Veolia Water Solutions & Technologies Support* v. *Siemens Industry, Inc.*, United States District Court, Eastern District of North Carolina, Western Division, Case No. 5:11-cv-00296-FL (126 pages).

Siemens Industry Inc.'s Amended Disclosure of Preliminary Noninfringement and Invalidity Contentions filed Oct. 15, 2012 in *Veolia Water Solutions & Technologies Support* v. *Siemens Industry, Inc.*, United States District Court, Eastern District of North Carolina, Western Division, Case No. 5:11-cv-00296-FL (154 pages).

Evoqua Water Technologies LLC's Answer to Plaintiffs Amended Complaint and Counterclaims filed Feb. 12, 2014 in *Veolia Water Solutions & Technologies Support* v. *Siemens Industry, Inc. and Evoqua Water Technologies LLC*, United States District Court, Eastern District of North Carolina, Western Division, Case No. 5:11-cv-00296-FL (32 pages).

Order on Claim Construction entered May 5, 2014 in *Veolia Water Solutions & Technologies Support* v. *Siemens Industry, Inc. and Evoqua Water Technologies LLC*, United States District Court, Eastern District of North Carolina, Western Division, Case No. 5:11-cv-00296-FL (53 pages).

Defendants' Amended Disclosure of Final Non-Infringement and Invalidity Contentions filed Jul. 9, 2014 in *Veolia Water Solutions & Technologies Support* v. *Siemens Industry, Inc. and Evoqua Water Technologies LLC*, United States District Court, Eastern District of North Carolina, Western Division, Case No. 5:11-cv-00296-FL (301 pages).

Hydrotech Discfilter Manuals, Series HSF13, 17, 21 (Series No. 2931, Version: Feb. 15, 2002) and HSF31 (Series No. 3013, Version: Feb. 15, 2002) and associated photographs (26 photographs).

* cited by examiner

ROTARY DISC FILTER AND MODULE FOR CONSTRUCTING SAME

CROSS-REFERENCE TO RELATED APPLICATION

The present application is a continuation of U.S. patent application Ser. No. 13/174,879 filed Jul. 1, 2011, which is a continuation of U.S. patent application Ser. No. 12/569,979 filed Sep. 30, 2009 (now U.S. Pat. No. 7,972,508 issued Jul. 5, 2011) which is a continuation of U.S. patent application Ser. No. 10/546,477 filed Jul. 26, 2006 (now U.S. Pat. No. 7,597,805 issued Oct. 6, 2009), which is a national stage filing under 35 U.S.C. §371 of International Application No. PCT/SE2004/000240, filed on Feb. 24, 2004. U.S. patent application Ser. No. 13/174,879 is incorporated herein by reference.

FIELD OF THE INVENTION

The present invention relates generally to a rotary disc filter. The rotary disc filter may comprise a drum having a central longitudinal axis and being rotatably arranged about the same and adapted to receive a liquid which is to be filtered. The rotary disc filter may also comprise at least one disc-shaped filter member which on the outside of the drum extends outwards in the transverse direction of the drum and which has a filter support and at least one filter portion supported thereby. Further, the rotary disc filter may comprise a first liquid duct extending from the drum through the filter member and out through the filter portion, the filter portion being made of filter segments, which are detachably secured to the filter support. The invention also relates to a module for building a filter support for a rotary disc filter.

BACKGROUND ART

Rotary disc filters are identified in, for example, Swedish Patent Application No. SE-C-224,131. In this filter, water is conducted through one end of a central rotatable drum and through openings in the circumference of the drum radially outwards to disc-shaped filter chambers. Each of the filter chambers are defined by a disc-shaped filter member having opposing filter portions which are supported by an annular filter support arranged between the same. The filter members are mounted in parallel along the longitudinal axis of the drum. When water flows out through the filter portions, particles are retained in the filter chambers. When cleaning the filter portions, the drum is rotated and water is flushed onto the filter portions from outside in the upper area of the rotary disc filter, particles and water flowing into the upper area of the drum and being collected in a trough extending through the drum. The filter portions comprise annular filter cloth portions arranged on the sides of the filter supports.

Swedish Patent Application No. SE-B-465,857 (WO 91/12067) discloses a rotary disc filter of a similar kind, in which the disc-shaped filter members comprise a plurality of separate, disc-shaped filter sections, which together establish annular filter members. The annular filter members are divided into a plurality of separate units, and the filter cloth is divided into smaller pieces. Therefore, in case of a local damage to the cloth a replacement of the cloth is necessary on only one of the filter sections, and not on an entire annular disc.

In the two rotary disc filters described above, the filter cloth can be fastened in one of a plurality of ways. In a common solution, the filter cloth is glued directly to the filter support on opposing sides thereof. This is particularly common when the cloth consists of some textile or plastic material. The cloth can also be made of metal. In that case, it is often welded to the filter support, and if necessary, reinforcement ribs are welded to the outside of the filter cloth for improved securing thereof. In a further way of fixing the cloth to the support, the cloth is designed as a "bag" which is slipped around a filter support and is shrunk on the same.

Rotary disc filter constructions of this kind suffer from several problems. For example, the filter cloth has a limited life in normal use and must be replaced at regular intervals. Moreover, the filter cloth is sensitive and can easily be damaged, necessitating a premature replacement thereof. If the cloth is damaged, an entire filter cloth portion must be replaced.

Rotary disc filters with detachably secured filter segments have therefore been developed. Such a rotary disc filter is disclosed in, for example, WO 99/30797, which discloses a rotary disc filter which has a filter portion consisting of several filter segments. The filter segments are detachably secured to a filter support and comprise a frame and a filter cloth expanded by the frame. The frame and the filter support are made of metal. Using detachably secured filter segments makes it easier to replace parts of the filter. This rotary disc filter functions in a satisfactory manner, but it is desirable to improve it further by, for instance, making manufacture less expensive. It would also be desirable to make these rotary disc filters lighter and less bulky when dimensioned for large flows. Moreover, it would be desirable for the filter discs to entrain a smaller amount of water in their rotary motion than has been possible so far. A smaller amount of water would then accompany the particles through the trough of the rotary disc filter for drawing off filtered-off particles, which could thus increase the capacity of the rotary disc filter.

SUMMARY OF THE INVENTION

An object of the present invention is to provide a rotary disc filter which is more compact and thus has a higher filtering capacity with the same space occupied.

Another object of the present invention is to provide a rotary disc filter which is lighter than previous rotary disc filters.

A further object of the present invention is to provide a rotary disc filter can be manufactured at a lower cost.

A further object of the present invention is to provide a module that enables construction of a filter support for a more compact rotary disc filter.

Yet another object of the present invention is to provide a module that enables less expensive construction of a filter support for a rotary disc filter.

A further object of the present invention is to provide a module for building a lighter rotary disc filter.

According to one embodiment of the present invention, a disc filter may have at least one second liquid duct which extends between adjoining filter segments to provide liquid communication between the filter segments. Therefore, liquid can move between the filter segments and is not entrained in the rotary motion. As a result, the capacity of the rotary disc filter increases.

In another embodiment of the present invention, the second liquid duct may comprise hollow spaces in the filter support. Liquid communication between the filter segments can thus be provided in an extremely simply way.

The filter support between the filter segments may comprise a framework construction, whose hollow spaces constitute the second liquid ducts. In this manner, liquid communication can easily be provided, while at the same time the support can be made sufficiently strong with great economy in material.

According to another embodiment of the present invention, the filter body may be made up of modules. A rational construction can thus be ensured.

Two modules may form a filter support around a filter segment, and the two modules may then be interconnected at a distance from surrounding filter segments. This makes it possible to avoid joints between the filter segments, which makes it easier to provide a tight construction.

The filter segments can be secured to the filter support by means of grooves in the filter support which are extended in the plane of the filter segments. The filter segments can thus be safely secured to the filter support while at the same time the filter segments are easy to insert and remove. Moreover, a certain self-sealing effect can be achieved.

According to yet another embodiment of the present invention, the filter support may form at least a portion of a circumferential surface of the drum. This makes it possible to manufacture the drum with a reduced consumption of material.

The filter support may be made of plastic and can thus be manufactured at a relatively low cost. Furthermore, the filter support may be corrosion-resistant.

According to yet another embodiment of the present invention, the module for building a filter support may comprise two inner support portions and two outer support portions for at least partial enclosure of two adjoining filter segments, and an intermediate support portion adapted to be arranged between the two adjoining filter segments. Using such modules makes it possible to effectively build a filter support.

The intermediate support portion may comprise at least one liquid duct for providing liquid communication between adjoining elements. As a result, liquid can move between the filter segments and is therefore not entrained when the filter support rotates during operation of the rotary disc filter. Therefore, the capacity of the rotary disc filter can be increased.

The intermediate support portion may comprise a framework construction, the hollow spaces of which constitute liquid ducts to provide liquid communication between adjoining filter segments. The framework construction may give good strength with a minimized consumption of material and further may provide ducts for the liquid to pass between the filter segments.

One end of the outer support portions and the inner support portions may include means for interconnecting two modules. The modules can thus be interconnected to form a filter support.

The inner support portions may be arranged to form portions of a circumferential surface of the drum, which makes it possible to build the drum using a small amount of material.

The outer support portions and the inner support portions may be symmetrically arranged on the intermediate support portion. Only one type of module may thus be required for building the filter support.

According to yet a further embodiment of the present invention, the module may comprise grooves for securing of filter segments. The grooves may extend in the plane of the filter segments. This makes it possible to safely secure the filter segments in a way that makes the segment easy to attach and detach.

According to a yet another embodiment of the present invention, the module is made of plastic. The module may thus be manufactured relatively inexpensively and may allow a light filter support to be built.

BRIEF DESCRIPTION OF THE DRAWINGS

The invention will now be described in more detail with reference to the accompanying schematic drawings which by way of example illustrate several embodiments of the invention.

DETAILED DESCRIPTION

Figure 1:
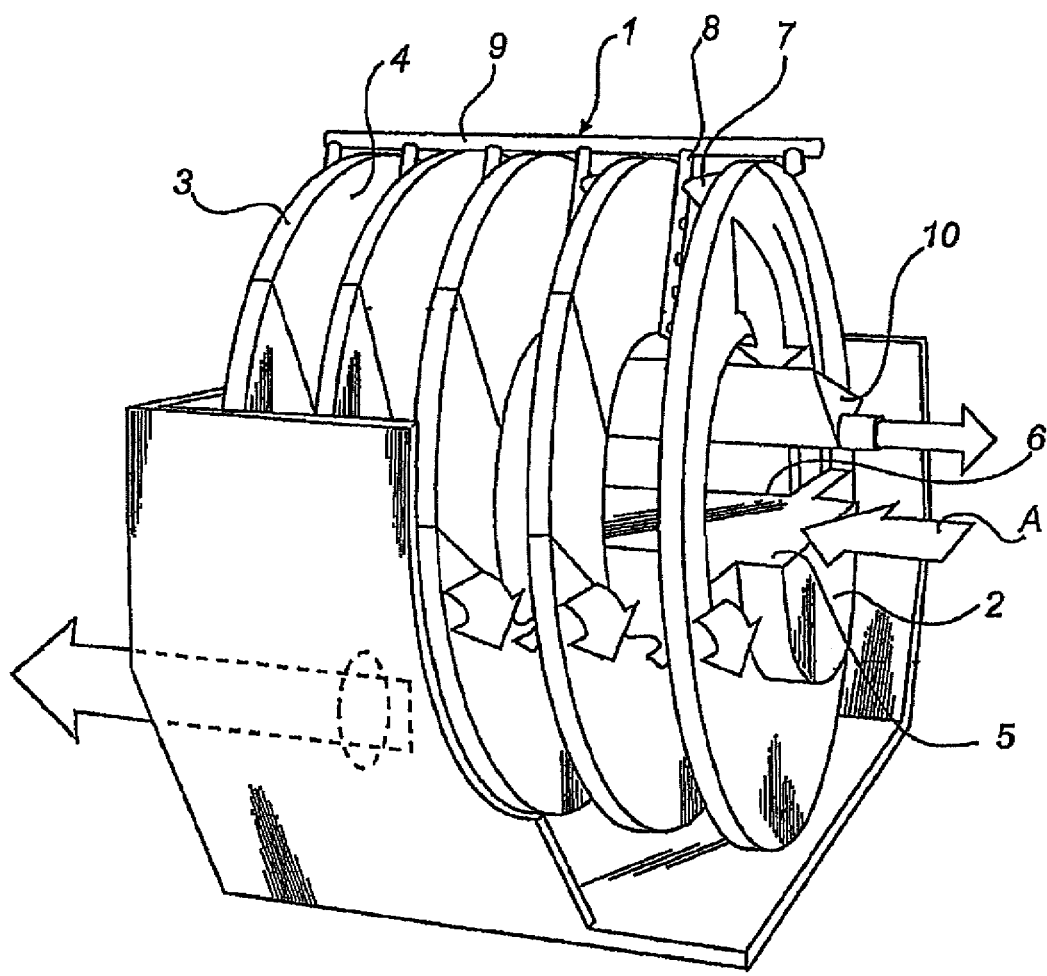
FIG. 1 is a perspective view which schematically shows the principle of a rotary disc filter according to the prior-art technique.

The fundamental function of a rotary disc filter according to one embodiment of the present invention is largely the same as for prior-art rotary disc filters of the type as shown in FIG. 1. The function of the rotary disc filter of the present invention will therefore be explained with reference to FIG. 1. The rotary disc filter 1 may have a slowly rotating drum 2 which supports a plurality of disc-shaped filter members 3, whose normal direction is parallel to and concentric with the longitudinal axis or rotary axis C of the drum 2 and whose lateral faces, which are axially directed and radially extended, support a filter cloth 4. The liquid A, which is to be filtered, is conducted through an inlet 5 to the interior of the drum 2. From the interior of the drum 2 the filtering liquid A is conducted out through openings in the circumferential surface 6 of the drum 2 to the interior of the disc-shaped filter members 3. From there, the filtering liquid A is finally conducted in a filtering direction out through the filter cloth 4. Any particles in the filtering liquid A may adhere to the inside of the filter cloth 4. The rotary disc filter 1 may include flushing nozzles 7 for cleaning of the filter cloth 4, which are mounted on a number of flush tubes 8 and which extend between the disc-shaped filter members. The flush tubes 8 may be adapted to conduct flush liquid to the flushing nozzles 7 and may be connected to an elongate liquid-conducting tube 9 which extends parallel to the centre axis C of the drum. The flushing nozzles may flush the filter cloth axially from outside, in a direction opposite to the filtering direction, and the flushed-out particles may be collected in a discharge trough 10, which is placed in the dorm 2 in the upper portion thereof.

Figure 2:
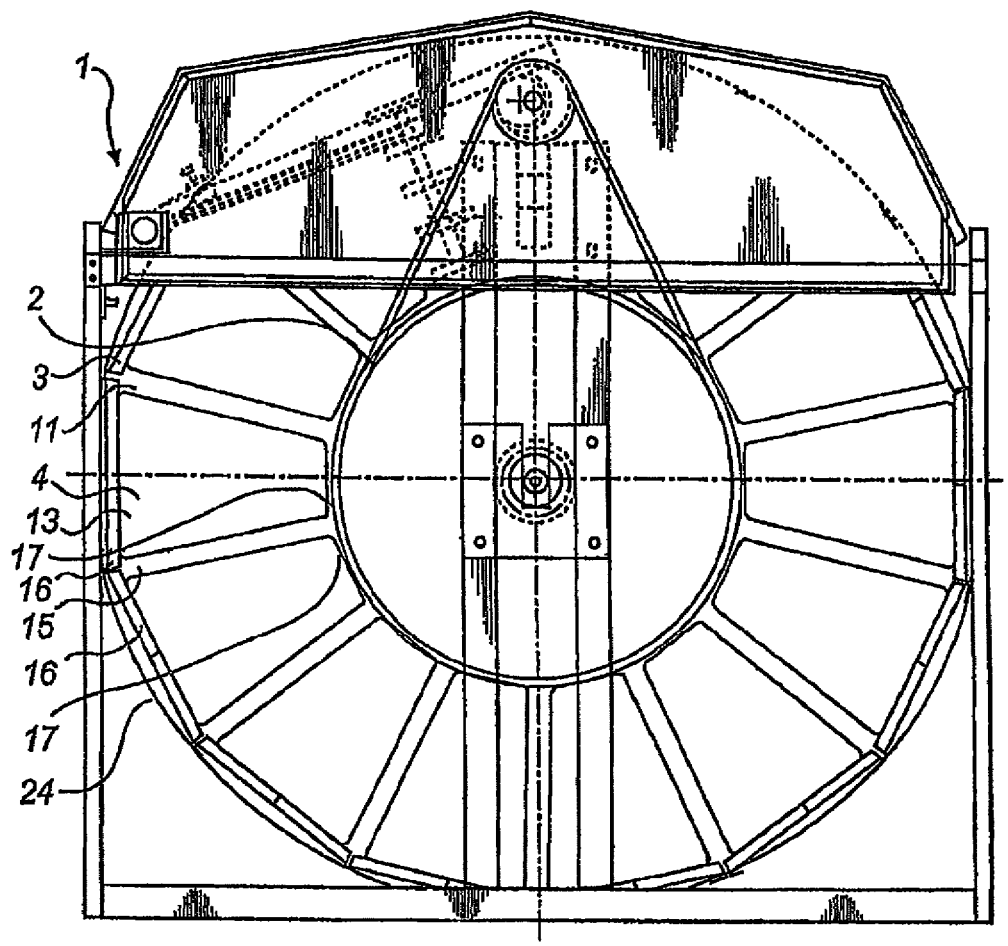
FIG. 2 is an end view of an exemplary rotary disc filter consistent with an embodiment of the present invention.
Figure 3:
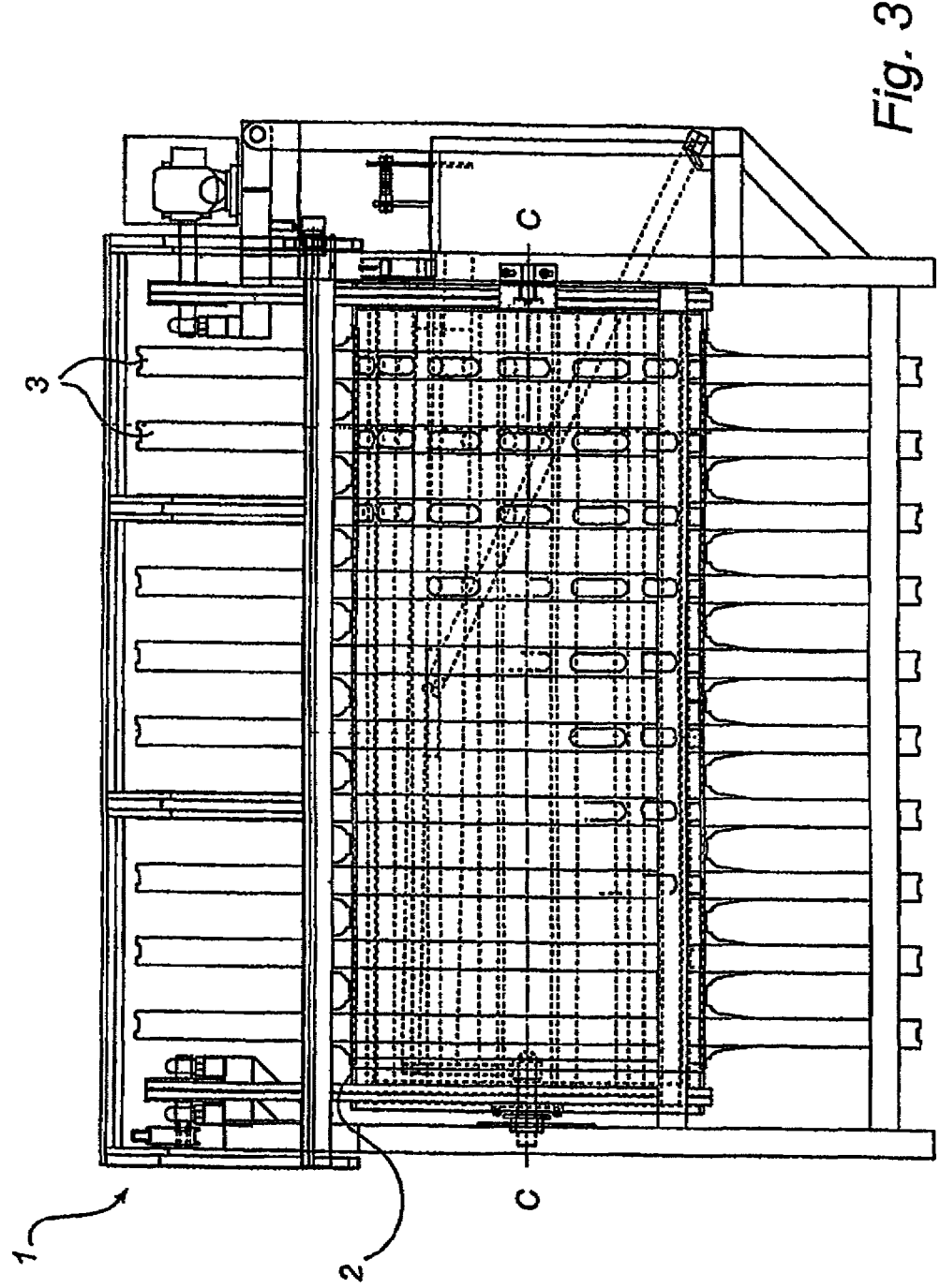
FIG. 3 is a side view of the exemplary rotary disc filter in FIG. 2, consistent with an embodiment of the present invention.
Figure 6:
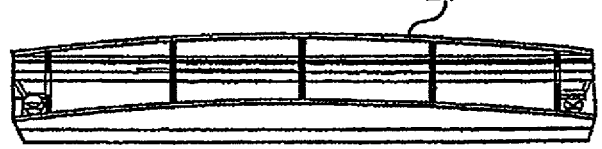
FIG. 6 is a top plan view of an exemplary filter segment consistent with an embodiment of the present invention.
Figure 5:
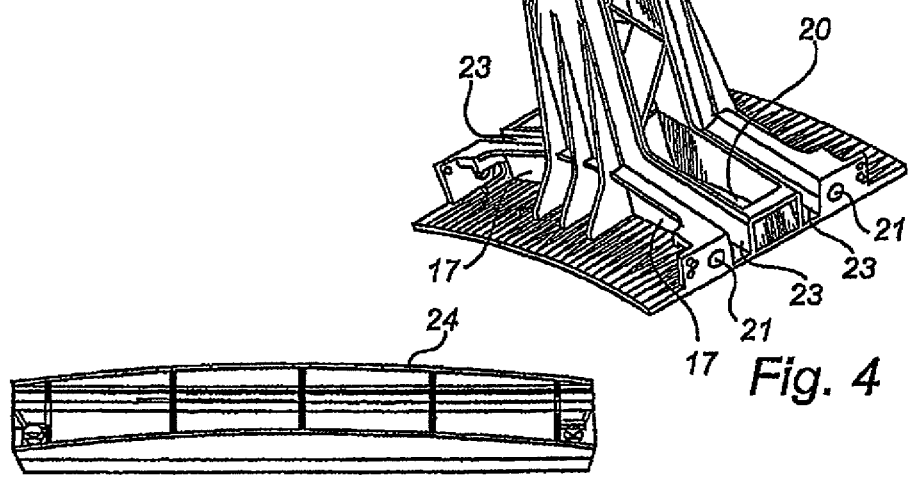
FIG. 5 is as perspective view of an exemplary closing means for securing filter segments in a rotary disc filter, consistent with an embodiment of the present invention.

As is evident from FIG. 2, the filter members 3 may have, according to one embodiment of the present invention, a filter support 11, which extends radially outwards in the transverse direction of the drum 2 and may be made up of a plurality of modules 12. The filter support 12 forms compartments in which filter segments 13 are arranged. As shown in FIG. 6, the filter segments 13 may consist of a frame 14 which expands the filter cloth 4.

Figure 4:
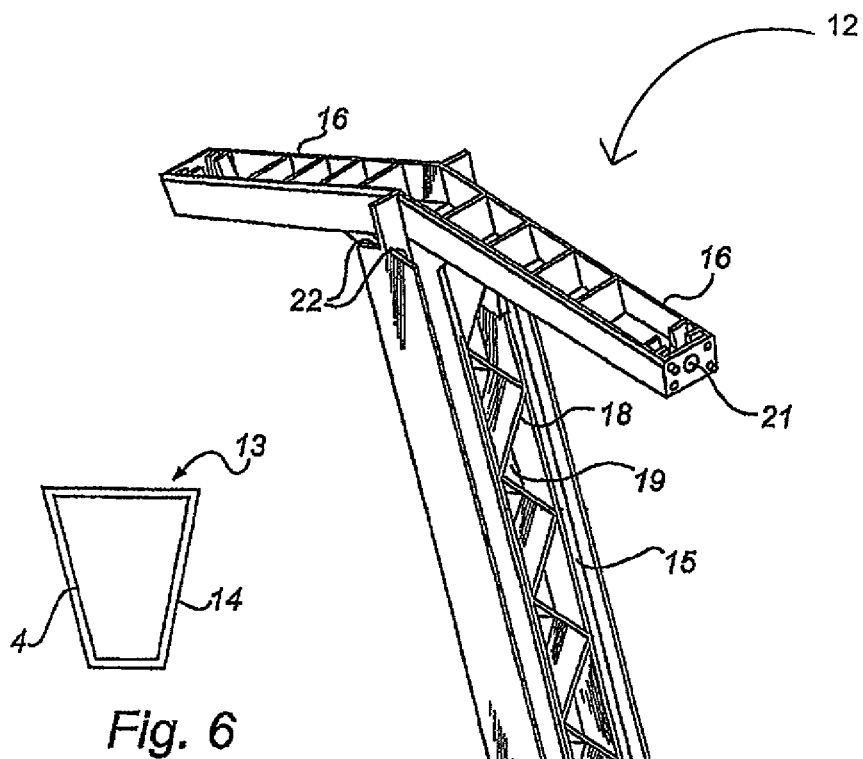
FIG. 4 is a perspective view of an exemplary module for building a filter support, consistent with an embodiment of the present invention.

As shown in FIG. 4, the modules 12 may have an intermediate support portion 15, from one end of which extends two outer support portions 16 outwards. From the other end of the intermediate support portion 15 extends two inner support portions 17 outwards. The intermediate support portion 15 may consist of a framework construction 18 with hollow spaces 19. The inner support portions 17 may have openings 20, which allow the liquid which is to be filtered to pass from the interior of the drum 2. The inner and outer support portions 17 and 16 may have, at their ends, holds 21 for insertion of screws for interconnecting two modules 12. On both sides of the intermediate support portion 15 there may be two grooves 22, which extend parallel to the intermediate support portion 15 in the plane of the filter support 11. In each of the inner support portions 17 there may be two parallel grooves 23, which may be parallel to the inner support portion 17 and extend in the plane of the filter support 11.

FIG. 6 shows an exemplary closing means in the form of a cover 24 for securing the filter segments 13 in the filter support 11, consistent with an embodiment of the present invention.

In construction of the rotary disc filter 1, seven modules 12 may be attached to each other by means of screws in the holes 21 in such manner that the modules form a semicircle. Two such semicircles may then be mounted on the drum 2 and bolted together to form a filter support 11. By joining the modules 12 in the center of the filter segments 13, tightness may be improved compared with the case where the joining would occur between two filter segments 13.

In each of the compartments formed by the filter support 11 between two adjoining modules 12, a filter segment 13 may be inserted into the grooves 22 and 23 on both sides of the modules 12. The cover 24 may be slipped on to the outer support portions 16 of two adjoining modules 12 and the two parallel filter segments 13 which these modules 12 enclose together. The cover 24 may be screwed to the outer support portions 16 of the modules 12. A number of thus constructed disc-shaped filter members 3 may be mounted on the drum 2 to provide the rotary disc filter 1. In one embodiment, ten filter members 3 are mounted on the drum 2. However, as many as twenty-two filter members can be arranged on a drum 2 to provide a rotary disc filter 1 with greater capacity.

In operation of the rotary disc filter 1, the liquid A, preferably polluted water, which is to be filtered, may be supplied through the inlet 5 at one end of the drum 2 and is passed through a first liquid duct which extends from the interior of the drum 2 through the openings 20 in the inner support portions 17 of the modules 12 and out through the filter cloth 4 of the filter members 3. The drum 2 rotates slowly and the filter segments 13, which are positioned in the lower part of their course, are passed by the liquid A. Pollutants may then adhere to the inside of the filter cloth 4. When the filter segments 13 are positioned in the upper part of their course, they may be cleaned by means of the above-described flushing equipment 7, 8, and 9. The flushed-out pollutants may then be removed by means of the discharge trough 10.

The hollow spaces 19 in the framework construction 18 of the intermediate support portions 15 form a second liquid duct through which the liquid A can move between the filter segments 13. In contrast to previous rotary disc filters, the liquid A may therefore not be entrained in the rotary motion of the filter members 3. The amount of liquid accompanying the pollutants out through the discharge trough 10 may thus be reduced. The speed of rotation of the drum 2 can thus be increased, which means that the capacity of the rotary disc filter 1 may be increased. Therefore, the rotary disc filter 1 can be made more compact than previous rotary disc filters. Also the load exerted on the suspension and driving device of the drum is reduced.

The rotary disc filter 1 can be mounted at the factory and be delivered ready for use, but the module construction also makes it possible to deliver modules 12 for mounting the rotary disc 1 at the site where it is to be used. The module construction also makes it easy to enlarge an existing rotary disc filter 1 in order to increase its capacity. Modules 12, filter segments 13 and covers 24 for one or more new filter members 3 can then be delivered and mounted in the existing rotary disc filter 1.

According to one embodiment, the modules 12 may be made by injection moulding of ABS plastic. Other plastic materials can be used, and a suitable manufacturing process is then selected with regard to the type of plastic. Plastic is advantageous since it is a relatively inexpensive material that is easy to work, and is also corrosion resistant. Other materials may also be selected, but it should be taken into consideration that it is convenient to use a material which has a low weight in relation to its strength, thus minimizing the weight of the completed rotary disc filter.

The frame 14 of the filter segments 13 may be made of pre-tensioned glass fiber, which makes the frame 14 strong, light and corrosion resistant. Alternatively, the frame 14 can be made of metal, preferably stainless steel. For sealing of the filter segment 13 against the filter support 4, the frame 14 may be enclosed by a rubber strip, for example, EPDM rubber. In order to facilitate insertion and removal of the filter segments 13 in the grooves 22, the outside of the rubber strip may be flocked, which reduces friction against the filter support 11. The seal may also be promoted by the filter segments 13, as the liquid A passes out through the filter cloth 4, being pressed outwards by the liquid pressure, so that the frame 14 is pressed against the outer boundary walls of the grooves 22 and 23.

In one embodiment, the filter cloth 4, which is expanded by the frame 14, may be a microfilter cloth with filter holes in the range 10-100 μm. The filter cloth 4 may be selected according to the filtering capacity that is required.

The inventive rotary disc filter can suitably be cleaned by means of a cleaning device, for example, the cleaning device described in SE-C-515,001 (WO 00/37159).

It will be appreciated that many modifications of the embodiments of the invention described above are feasible within the scope of the invention, which is defined in the appended claims.

In the example shown, the modules 12 may be mounted on a drum 2, the circumferential surface 6 of which has openings for the liquid to pass from the interior of the drum 2 to the filter segments 11. The lightweight modules 12 make it possible to select instead to make a skeleton for a drum and let the inner support portions 17 form the circumferential surface of the drum on the outside of the skeleton.

Instead of making the intermediate support portions 12 with a framework construction 18, the intermediate support portions can be given a flat web in which holes are bored to provide liquid communication between the filter segments.

The invention claimed is:

1. A modular rotary disc filter for filtering a liquid, comprising:
   a. a rotary drum for receiving the liquid and having a plurality of openings for permitting the liquid to flow from the drum;
   b. a drive for rotatively driving the rotary drum;
   c. one or more modular disc-shaped filter members secured around the drum for receiving the liquid from the drum and filtering the liquid;
   d. each disc-shaped filter member including a plurality of modules that form, in part at least, a series of compartments that extend around the drum and form a part of the disc-shaped filter member such that each compartment is disposed between and next to two other compartments;

e. each compartment of the disc-shaped filter member being bound, at least in part, by opposed edge structures and on opposite sides by two filters;

f. each edge structure having a length and a substantial open area along substantially the entire length of each edge structure for permitting liquid communication between the compartments such that as the disc-shaped filter member and compartments are rotated, liquid in the disc-shaped filter member passes through the open areas in the edge structures and passes from one compartment to an adjacent compartment; and g. wherein liquid held in the disc-shaped filter member is filtered by flowing outwardly through the filters on opposite sides of the compartments.

2. The modular rotary disc filter of claim 1 wherein each compartment is constructed in part at least by plastic and further comprises an inner structure, an outer structure spaced outwardly from the inner structure, and wherein each compartment is formed, in part at least, by the edge structures, the inner structure, the outer structure and the opposed filters.

3. The modular rotary disc filter of claim 2 wherein the inner structure of each compartment includes at least one opening for permitting liquid to flow from the drum into the compartment.

4. The modular rotary disc filter of claim 2 wherein the inner structure of each compartment is curved.

5. The modular rotary disc filter of claim 1 wherein each compartment is formed in part at least by two consecutive modules connected to each other and which form the opposed edge structures and the inner structure of each compartment.

6. The modular rotary disc filter of claim 5 wherein the two consecutive modules are connected together and form a curved inner structure of each compartment.

7. The modular rotary disc filter of claim 6 wherein each compartment includes an outer structure that comprises outer supports forming a part of the two consecutive modules.

8. The modular rotary disc filter of claim 1 wherein the compartments of the disc-shaped filter member are spaced one after the other around the disc-shaped filter member and wherein the open areas in the edge structures of each compartment enable liquid held in the disc-shaped filter member to pass through all of the compartments of each disc-shaped filter member when the disc-shaped filter member is rotated.

9. The modular rotary disc filter of claim 8 wherein the disc-shaped filter member and the compartments thereof are configured to provide for circumferential flow of liquid through all of the compartments as the disc-shaped filter member is rotated.

10. The modular rotary disc filter of claim 1 wherein the open areas in the edge structures substantially prevents liquid in the disc-shaped filter member from being entrained by the rotary motion of the disc-shaped filter member.

11. The modular rotary disc filter of claim 8 wherein each compartment of the disc-shaped filter member joins two other compartments such that as the disc-shaped filter member is rotated liquid held in a lower portion of the disc-shaped filter member passes through the open areas of the edge structures of the compartments and passes from one compartment to an adjacent compartment.

12. The modular rotary disc filter of claim 1 wherein the edge structures that form parts of the compartments comprise circumferentially spaced radial arms that project outwardly from the drum.

13. The modular rotary disc filter of claim 1 wherein each module includes a base and a support arm extending outwardly from the base; wherein the modules are connected together such that the bases of two modules form an inner structure of one compartment and the support arms of two consecutive modules form the opposed edge structures of one compartment.

14. The modular rotary disc filter of claim 13 wherein each module further includes outer supports that project from an outer end portions of the support arm, and wherein the outer supports of two consecutive modules forms, in part at least, an outer structure of one compartment.

15. The modular rotary disc filter of claim 1 wherein the substantially open area along the length of each edge structure includes multiple openings formed in each of the edge structures.

16. A rotary disc filter for filtering a liquid comprising:

a. a rotary drum for receiving the liquid and having a plurality of openings for permitting the liquid to flow from the drum;

b. one or more disc-shaped filter members secured around the drum for receiving liquid from the drum and holding the liquid in a lower portion thereof and filtering the liquid;

c. each disc-shaped filter member including a plurality of adjoining compartments that are disposed around the disc-shaped filter member and around the drum;

d. each compartment of the disc-shaped filter member formed by an inner structure disposed adjacent the drum, an outer structure disposed outwardly of the inner structure, opposed edge structures, and a pair of filters disposed on opposite sides of the compartment;

e. each edge structure of each compartment including a length and an open area along the length that is effective to permit liquid communication between all of the compartments of the disc-shaped filter member such that as the disc-shaped filter member and compartments thereof are rotated, liquid in the disc-shaped filter member passes through the open areas in the edge structures and from one compartment to an adjacent compartment; and f. wherein liquid held in the disc-shaped filter member is filtered by flowing outwardly through the filters disposed on opposite sides of the compartments; and wherein each edge structure of each compartment includes an open area along most of the length of the edge structure such that liquid can move between all the compartments and is not entrained when the disc-shaped filter member rotates during operation of the rotary disk filter.

17. The rotary disc filter of claim 16 wherein the open areas of the edge structures of the compartments are configured to generally prevent the liquid in the disc-shaped filter member from being entrained by the rotary movement of the disc-shaped filter member.

18. The rotary disc filter of claim 16 wherein the compartments and open areas of the edge structures are configured such that liquid held in the disc-shaped filter member passes circumferentially through the compartments as the disc-shaped filter member and the compartments thereof are rotated.

19. The rotary disc filter of claim 16 wherein each compartment is formed, in part at least, by first and second consecutive modules that are connected together.

20. The rotary disc filter of claim 19 wherein each of the first and second modules form a part of the inner structure of two adjacent compartments and form one edge structure of two adjacent compartments.

21. The rotary disc filter of claim 16 wherein each compartment of the disc-shaped filter member is formed by an inner structure disposed adjacent the drum, an outer structure disposed outwardly on the inner structure, and opposed edge structures, and filters disposed on opposite sides of the compartment; wherein the inner structure, outer structure and opposed edge structures of each compartment is constructed of plastic; and wherein each edge structure includes a length and wherein the open area includes multiple openings formed along substantially the entire length of the edge structures such that liquid can move between compartments as is therefore not entrained when the disc-shaped filter member is rotated during the operation of the rotary disc filter.

22. The rotary disc filter of claim 16 wherein the disc-shaped filter member includes a plurality of like modules that, in part at least, form the compartments of the disc-shaped filter member, each module comprising:
  i. a base secured adjacent the rotary drum and including an opening for permitting liquid to flow through;
  ii. a support arm projecting outwardly from the base; and
wherein the bases of the modules form parts of the inner structures of the compartments and the support arms of the modules form edge structures of the compartments.

23. The rotary disc filter of claim 22 wherein the bases of the modules are connected in end-to-end relationship around the drum.

24. The rotary disc filter of claim 22 wherein each module includes outer supports that form at least a part of the outer structures of the compartments.

25. The rotary disc filter of claim 16 wherein the filters disposed on opposite sides of each compartment comprise two filter segments supported in grooves formed in at least the opposed edge structures of each compartment.

26. The rotary disc filter of claim 22 wherein the bases of the modules are curved to fit around the rotary drum.

27. The rotary disc filter of claim 26 wherein the bases of the modules are connected in end-to-end relationship around the drum.

28. The rotary disc filter of claim 16 wherein the compartments are constructed of plastic.

29. The rotary disc filter of claim 16 wherein the open area along the length of each edge structure includes multiple openings.

30. The rotary disc filter of claim 22 wherein each module is a plastic module and wherein the base includes a plate disposed adjacent the rotary drum; and wherein the support arm is a radial support arm that extends radially with respect to the rotary drum and is integral with the base; and wherein the rotary disc filter includes a series of fasteners for securing the bases together in end-to-end relationship around the rotary drum.

31. The rotary disc filter of claim 16 wherein the filters disposed on opposite sides of each compartment comprise a pair of filter segments and wherein the filter segments are retained, in part at least, within grooves formed in the edge structures that form the compartments.

32. The rotary disc filter of claim 24 wherein each compartment includes a cover secured to the outer supports and wherein the outer supports and covers form, in part at least, the outer structures of the compartments.

33. A modular rotary disc filter comprising:
  a. a rotary drum for receiving and holding liquid;
  b. a drive for rotatively driving the rotary drum;
  c. one or more disc-shaped filter members secured about the drum and extending outwardly therefrom, each disc-shaped filter member being rotateable with the drum;
  d. each disc-shaped filter member including a modular filter frame made up, in part at least, by a series of like and connected modules;
  e. each module comprising:
    i. a base;
    ii. a support arm projecting outwardly from the base;
  f. the disc-shaped filter member including a series of compartments that are disposed around the disc-shaped filter member wherein each compartment is defined, in part at least, by two consecutive like modules;
  g. filters supported by the modules and disposed on opposite sides of each compartment for filtering liquid; and
  h. each support arm having a length and a substantial open area formed substantially along the entire length of the support for permitting liquid communication between adjacent compartments such that as the disc-shaped filter member and compartments are rotated, liquid in the disc-shaped filter member passes through the open areas in the support arms and from one compartment to an adjacent compartment, such that as the disc-shaped filter member and compartments are rotated, liquid in the disc-shaped filter member passes circumferentially through the compartments.

34. The rotary disc filter of claim 33 wherein the filters disposed on each side of the compartment comprise a pair of filter segments.

35. The rotary disc filter of claim 34 wherein each module includes a plurality of grooves for receiving and retaining a plurality of the filter segments.

36. The rotary disc filter of claim 33 wherein the base of each module includes opposed ends and wherein each end of the base is configured to connect to the end of another base in end-to-end relationship.

37. The rotary disc filter of claim 33 wherein the base of each module includes a curve plate secured adjacent the rotary drum, and wherein the base and support arm are integral.

38. The rotary disc filter of claim 33 wherein each module includes a pair of outer supports that project from an upper portion of the support arm.

39. The rotary disc filter of claim 38 wherein the disc-shaped filter member includes a series of covers that are secured to the outer supports.

40. The rotary disc filter of claim 33 wherein the support arm includes a plurality of openings formed along the length of the support arm.

41. The rotary disc filter of claim 35 wherein the grooves are formed in the base and support arm of the modules, and wherein each compartment is bound on opposite sides by two filter segments retained in the grooves of at least two modules.

42. The rotary disc filter of claim 33 wherein the bases of the modules are connected together in end-to-end relationship around the drum, and wherein the modules are also connected together outwardly of the bases.

43. The rotary disc filter of claim 33 wherein each compartment is bound, in part at least, by portions of the bases of two modules, the support arms of the two modules, a connecting structure extending between outer portions of the support arms, and two filter segments disposed of opposite sides of the compartment.

44. The rotary disc filter of claim 43 wherein the connecting structure extending between outer portions of the support arms include at least two outer supports that are integral with the support arms and project therefrom.

45. The rotary disc filter of claim 33 wherein the open areas along the length of the support arms is effective to prevent substantial portions of the liquid in the disc-shaped filter member from being entrained by the rotary movement of the compartments as the disc-shaped filter member is rotated.

46. The rotary disc filter of claim 33 wherein the open areas along the length of the support arms are configured to reduce the tendency of the liquid to be entrained in any of the compartments as the compartments move with the rotating disc-shaped filter member.

47. The rotary disc filter of claim 33 wherein each module comprises a plastic module and wherein the base includes a curve plate disposed adjacent the rotary drum; and wherein the support arm is a radial support arm that extends radially with respect to the rotary drum and is integral with the base, and wherein the rotary disc filter includes a series of fasteners for securing a series of bases together in end-to-end relationship around the rotary drum.

48. The rotary disc filter of claim 33 wherein the disc-shaped filter member includes a rim structure that extends around the disc-shaped filter member and connects outer portions of the modules together.

49. The rotary disc filter of claim 33 wherein the base of each module includes a curved bottom, and a raised structure disposed on the curved bottom and having portions elevated with respect to the curved bottom; the curved bottom being secured adjacent the rotary drum; and wherein the raised structure disposed on the curved bottom forms, in part at least, an opening in the base for permitting liquid to flow through, and therein the support arm is integral with the raised structure of the base and extends outwardly therefrom.

50. The modular rotary disc filter of claim 1 wherein the open areas in the edge structures are sufficiently large such that as the disc-shaped filter member is rotated, liquid in the compartments passes through the open areas in the edge structures and from one compartment to another without being substantially entrained within the rotating compartments moving with the rotating disc-shaped filter member.

51. The rotary disc filter of claim 8 wherein the open areas in the edge structures enable liquid to move between compartments and therefore not be entrained when the disc-shaped filter member rotates during operation of the rotary disc filter.

* * * * *